United States Patent [19]

Wang

[11] Patent Number: 4,918,670
[45] Date of Patent: Apr. 17, 1990

[54] METHOD FOR INTERVAL VELOCITY ANALYSIS AND DETERMINATION OF REFLECTOR POSITION FROM BEFORE STACK SEISMIC DATA

[75] Inventor: Shein S. Wang, Ponca City, Okla.

[73] Assignee: Conoco Inc., Ponca City, Okla.

[21] Appl. No.: 310,971

[22] Filed: Feb. 15, 1989

[51] Int. Cl.$^4$ .............................................. G01V 1/28
[52] U.S. Cl. ........................................ 367/38; 367/59
[58] Field of Search ................... 367/38, 50, 53, 56, 367/57, 59; 364/421

[56] References Cited

U.S. PATENT DOCUMENTS

| | | | |
|---|---|---|---|
| 2,276,335 | 3/1942 | Peterson | 367/36 |
| 2,849,182 | 8/1958 | Winterhalter | 364/421 |
| 3,078,947 | 2/1963 | Neitzel | 367/56 |
| 3,353,151 | 11/1967 | Rockwell | 367/38 |
| 3,611,278 | 10/1971 | Guinzy | 367/63 |
| 3,638,177 | 2/1972 | Lindblade et al. | 367/51 |
| 3,794,827 | 2/1974 | Widess | 367/54 |
| 4,110,729 | 8/1978 | Vreugde | 364/421 |
| 4,259,733 | 3/1981 | Tauer et al. | 367/61 |
| 4,571,710 | 2/1986 | Neidell et al. | 367/38 |
| 4,627,036 | 12/1986 | Wyatt | 367/57 |
| 4,706,223 | 11/1987 | Zimmerman | 367/38 |

Primary Examiner—Thomas H. Tarcza
Assistant Examiner—Ian J. Lobo

[57] ABSTRACT

A method for interval velocity analysis and reflector position determination from before stack seismic data includes developing a constant travel-time curve for a source and receiver pair. The process is repeated with other source and receiver pairs in order to generate a set of constant travel-time curves, and a series of the travel-time curves define an envelope curve for the reflector which is sharply focused at the true interval velocity. An additional embodiment provides a method for quantifying the velocities and permitting selection of the best velocity. Use of this selection method greatly enhances the speed and the overall operation accuracy.

10 Claims, 6 Drawing Sheets

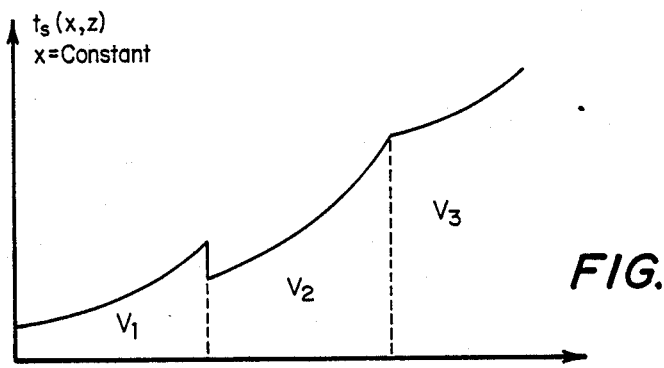
FIG. 1
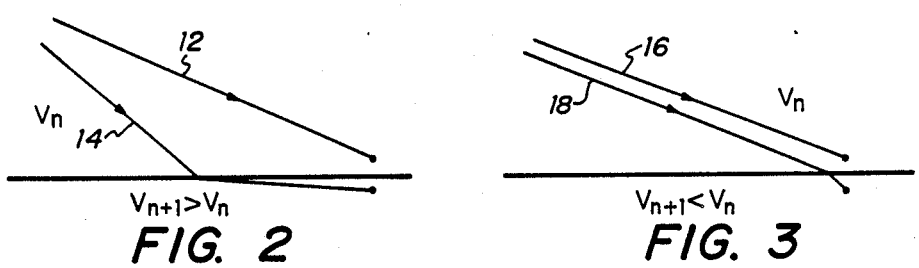
FIG. 2
FIG. 3
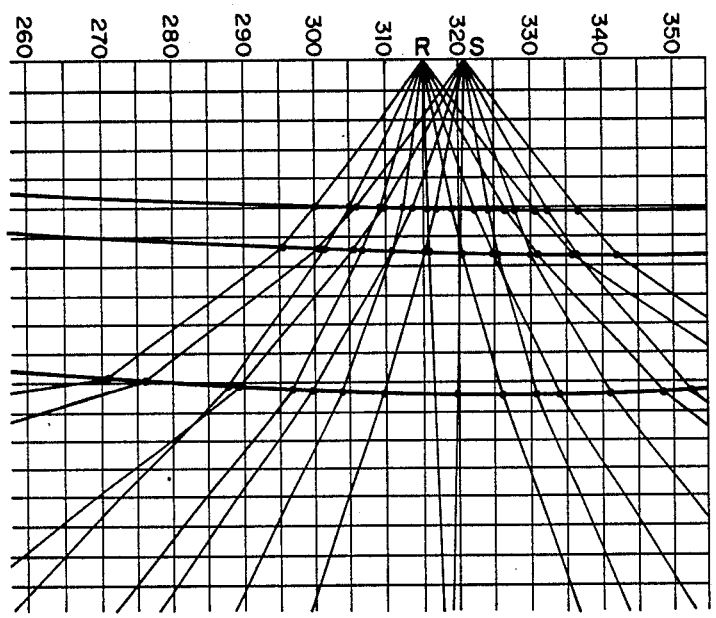
FIG. 4

METHOD FOR INTERVAL VELOCITY ANALYSIS AND DETERMINATION OF REFLECTOR POSITION FROM BEFORE STACK SEISMIC DATA

BACKGROUND OF THE INVENTION

1. Field of the Invention

The present invention pertains to the determination of the location of subsurface reflectors and more particularly to the development of a suite of constant travel time curves defining an envelope curve that is sharply focused at the true interval velocity, thus permitting determination of the reflector location.

2. Related Prior Art

The determination of the location of subsurface reflectors has been a continuous endeavor in the search for hidden hydrocarbons, often known as oil exploration. In this endeavor, many methods have been associated with the processing of seismic or acoustic waves to approximate the location of elusive subsurface interfaces. Among these methods are the determination of the average subsurface velocity, or the average of a plurality of subsurface interval velocities, i.e. the velocity between interfaces or reflectors. With an estimate of the average velocity, a time and depth correlation is achieved to approximate the location of subsurface reflectors or density changes. Although the determination of the location of subsurface reflectors is complicated by dipping formations, multiple reflections between interfaces, refraction of acoustic waves and other non-linear events, the determination of reflector depth has its basis in velocity determination.

Some examples of prior art methods that are used to determine subsurface acoustic velocity are as follows. All of these methods compute the velocity by iterative or repetitive means.

U.S. Pat. No. 3,611,278 titled "Interval Velocity Determination" (Guinzy et al) relates to the conversion of a suite of seismograms to values of interval velocity and dip for each subsurface layer encountered in geophysical exploration. An iteration process fits an arbitrarily dipping Snell's Law layered model to the observed field seismograms. Use of the velocity model permits a migration of original data into its true spatial positions.

A prior art method for determining the interval velocity in an area between reflectors is discussed in U.S. Pat. No. 4,110,729 which is titled "Reflection Seismic Exploration: Determining Interval Velocity in a Subsurface Layer" (Vreugde). This patent relates to a reflection seismic exploration system which reduces the influence of near surface irregularities, without knowing or measuring these irregularities. This system determines the velocity of a seismic signal between two reflectors, the normal travel time in the layer between the reflectors, and the thickness of the layer. Two consecutive shots, spaced apart along the surface, are fired into the same spread of detectors. Three different time-distance relationships are recorded. First, the relative arrival times of the reflections from each of the two reflectors at each of an array of detectors for one of the shots, and the shot-detector distances along the surface are recorded. Second, the difference between the relative arrival times of the reflections of the two shots from the shallower reflector at each detector and the distances between each detector and the midpoint between the shots is recorded. And, finally, the difference between the relative arrival times of the reflections of the two shots from the deeper reflector at each detector and the distances between each detector and the midpoint between the shots is recorded.

The first, second and third time-distance relationship are curve-fitted to defined expressions to find the values of selected coefficients of these expressions. The coefficient values are combined to find the normal interval time and the interval velocity in the layer between the two reflectors, which are indicative of the nature of the layer. This is done to determine the thickness of the layer.

Another method for determining the interval velocity between reflectors is discussed in U.S. Pat. No. 4,571,710 titled "Seismic Method for Identifying Low Velocity Subsurface Zones" (Neidell et al). This patent is primarily concerned with the determination of zones between reflectors which have a velocity below a predetermined maximum. Neidell et al. relates to a method of producing a two-dimensional display from exploration seismic data designed to indicate zones of anomalous low velocity in the subsurface. Such zones may be indicative of porosity and the possible occurrence of hydrocarbons. These zones are localized in terms of position along the seismic profile and in the approximate zone of reflection arrival time. Data used in making the display is derived from both the common depth point (CDP) stacked seismic profile and corresponding velocity analyses used to stack the data. Stacking velocity curves are plotted according to CDP location for each reflector of interest. These curves are overlain in pairs using calibration calculations. Calibration is used to reduce noise and compensate for velocity variations resulting from changes in separation or dip of the two reflectors from which the overlain velocity curves are derived. It is presumed that the interval bracketed by each reflector pair taken in turn has uniform or only regional lateral variations of interval velocity. Convergence of the paired curves indicate zones of either high or low interval velocity of local nature. A display of the velocity curves for all possible reflector pairs and vertical bands of color which are assigned to identify the reflection interval of particular low velocity zones may be provided. Horizontal position is indicated by the CDP location.

U.S. Pat. No. 3,794,827 titled "Invel System of Velocity Determination" (Widess) relates to a method of compositing multifold common-depth-point data from seismic prospecting operations to improve the making of static corrections, particularly when determining velocity. These static corrections are used to eliminate time differences in arrival of reflected seismic events on the various traces of a seismic spread due to differences in thickness of the low velocity or "weathered" layer below the geophones. Seismic waves are generated successively at generating points, each near the earth's surface. Seismic waves are received and reproducibly recorded at geophones at least one of which is close to the generating point and another is near the location of another generating point. Reproduced reflected waves from each generating point received at the respective near geophone locations are composited at approximately equal peak amplitudes. This procedure is then repeated for new generating and receiving points which maintain the mean location of reflection points on the seismic reflecting beds. Visual traces equivalent to the composited short traces are reproduced after elimination of the normal moveout correction. The reflections from a common reflecting bed are aligned by introducing a static correction into each composited trace to produce substantial time alignment at a mean reflection time. The identical seismic static correction is then applied to any further record processing of the seismic data from the far geophones, similarly composited, before producing visual traces of such data.

U.S. Pat. No. 3,638,177 titled "Method and Apparatus for Seismic Signal Velocity Determination" (Lindblade et al.) relates to a method for determining actual velocities of seismic events occurring on plural seismic traces by deriving a trace coherence factor which varies directly with signal velocity. The method consists of processing move-out-corrected, plural seismic traces at a plurality of different time delay per trace relationships to establish a coherence factor at each time delay per trace. The coherence factor is determined for each probable velocity by summing all trace values and then finding a respective difference value between each of the trace values and the sum value. The difference values are further processed by summation of their absolute values for derivation of a reciprocal trace value. The reciprocal trace value is then utilized as a gain control factor for controlling time variation of the amplitude of summed seismic traces. The output trace value controlled in this manner constitutes an accurate indicator of coherence of events occurring at the selected velocity.

U.S. Pat. No. 2,276,335, titled "Method of Making Weathering Corrections" (Peterson) relates to a method for determining the depth of the weathered layer of the earth. Also included in this patent are methods for determining the wave velocity in the weathered layer once the depth is determined by combining this determination with the vertical two way travel time. In addition, this patent contains a discussion of a method for determining the acoustic velocity in the high speed layer located directly beneath the weathered layer.

A typical example of the use of velocity determination for vertical seismic profiling may be found in U.S. Pat. No. 4,627,036, titled "Vertical Seismic Profiling" (Wyatt). In Wyatt, segments of vertical seismic profile data are mapped into surface seismic data time. By this transformation, data which is more easily interpreted with respect to determining subsurface structures is provided. The method presented in Wyatt uses subsurface velocity to convert seismic data obtained from receivers located downhole to data resembling conventional seismic data.

SUMMARY OF THE INVENTION

The present invention provides a method for determining the location of a geological subsurface reflector. This reflector is most commonly an interface, one side of which contains material having a density significantly different from the material on the other side. Seismic pulses are generated by sources, transmitted into the earth, reflected back and detected by seismic pulse receivers. Seismic data is received from a plurality of source receiver pairs. A constant travel time curve is developed for each source receiver pair. An envelope curve is defined by providing a display of a series of the travel time curves. The location of the reflector is determined by identifying the position of the envelope curve where the interval velocity is sharply focused. In a second embodiment, a method for focusing constant travel time curves is presented. A basement position having a representative vertical line is selected. The points where the constant travel time curves cross the vertical line representing the basement location are determined. The correct subsurface velocity is identified by locating the section of the line where constant travel time curve crossing points are concentrated.

BRIEF DESCRIPTION OF THE DRAWINGS

FIG. 1 is a graphical representation of subsurface velocity as a function of depth for a single location.

FIGS. 2 and 3 are examples of raypaths through two formations having unequal propagation velocities.

FIG. 4 illustrates a set of rays from a source and a set of rays from a receiver.

DESCRIPTION OF THE PREFERRED EMBODIMENT

Figure 5:
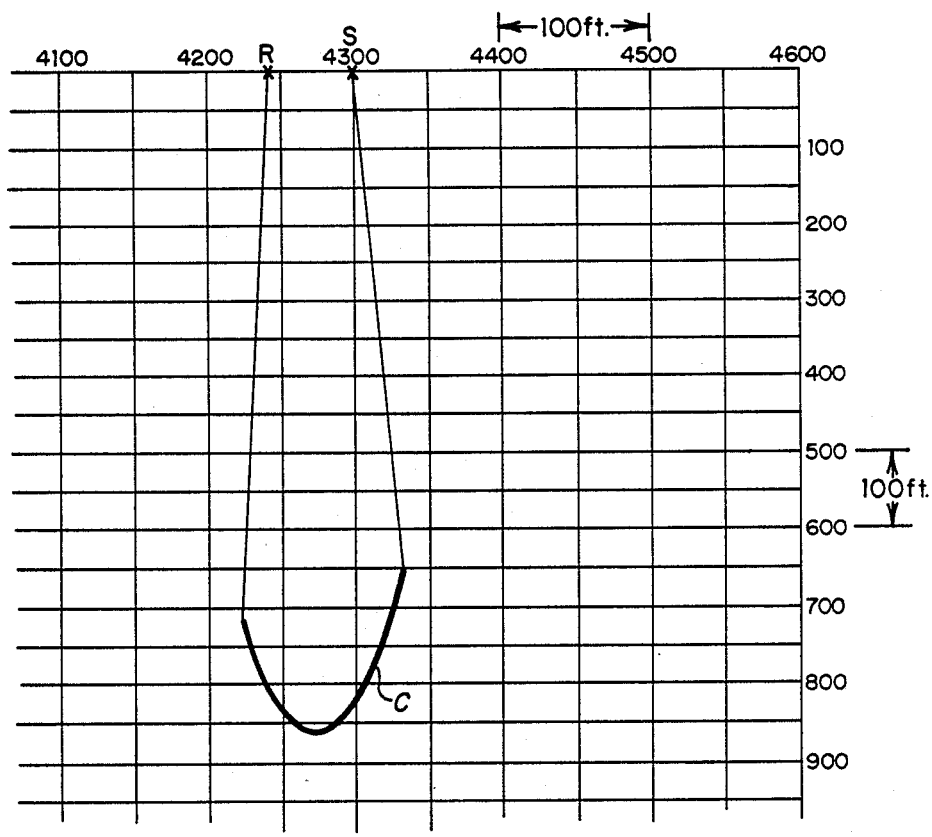
FIG. 5 is a graphical representation of a typical constant travel time curve.

Before-stack seismic data contains very accurate information about the interval velocities and the boundaries of different rock layers. The present invention provides a process to bring out this useful information accurately.

A set of travel time picks is given, representing a reflection of a seismic pulse from a certain reflector as recorded by many shot gathers. The actual position of this reflector is to be found so that the computed ray travel time from the source to the reflector and reflected back to the receivers would best fit the given travel times.

Under normal circumstances, the approximate subsurface acoustic velocity is provided by the user and the location of the reflector is found by iteration. An initial approximation of its position is made, the travel times are computed by forward modeling, and the initial approximation is modified based on the residual travel time errors. By way of comparison, the present invention determines the interval velocity accurately and maps the reflector position deterministically without the need of iteration. Thus, the present invention avoids the convergency problem of an iterative algorithm. Further, the present invention does not require an initial approximation, which is sometimes difficult to make.

The method of the present invention may be described in two parts. In the first part, how the reflector can be mapped when the interval velocity above the reflector is known is described. In the second part, interval velocity analysis process is presented.

It is assumed that the interval velocity and reflector position of the first (n−1) layers is known. The present invention provides a method wherein the n-th reflector can be mapped, if the interval velocity $v_n$ above is given.

Let
S = source position
R = receiver position
$t_g$ = given (selected) travel time to be matched
x = a basement horizontal position
z = depth coordinate, so (x,z) is a point in the model
$r_n$ = n-th reflector
$v_n$ = interval velocity between reflectors (n−1), n
$t_s(x,z)$ = travel time from Source Position S to (x,z)
$t_r(x,z)$ = travel time from Receiver Position R to (x,z)

To evaluate $t_s(x,z)$, a plurality of rays are considered from source position S between angles $\theta_{min}$ and $\theta_{max}$. For each ray, both the time t and depth z when this ray crosses the horizontal position x are calculated. The value of t is the one-way travel time from S to (x,y), namely, $t_s(x,z) = t$.

In actual practice, two hundred to four hundred equally spaced x values are selected every 200 feet or so apart. Using the above described procedure, $t_s(x,z)$ at x for all rays crossing this x is computed. We then have $t_s$ as a function of z for an arbitrary x. FIG. 1 is an illustration of $t_s$ as a function of z for an arbitrary x, which is constant.

The curve representing $t_s$ in FIG. 1 is discontinuous at every reflector n where the interval velocity $v_{n+1}$ below is greater than the $v_n$ above it. This is because the ray that goes to the point under the reflector can find a faster path and arrives with a shorter travel time. This is illustrated in FIG. 2 for raypaths 12 and 14. The travel time along raypath 14 is shorter than along raypath 12. If $v_n$ is greater than $v_n+1$, $t_s$ is continuous across this reflector, but its derivative is discontinuous. Raypaths 16 and 18 in FIG. 3 illustrate an example where the travel time along raypath 18 is longer than the travel time along raypath 16.

FIG. 4 illustrates an example of a method used to determine the total travel time to any point (x,z). By providing rays from a receiver position R, $t_r(x,z)$, which is the one-way travel time from R to all points in the model, can be computed. Similarly, by providing rays from a source at position S, the one way travel time $t_s(x,z)$ from S to all points in the model can be computed. Adding $t_s(x,z)$ to $t_r(x,z)$ numerically, a function which gives us the total travel time from S to (x,z) to R, following first the ray from S to (x,z) and then another ray from (x,z) to R is obtained.

A particular point c is to be identified such that the total travel time from S to c then to R equals the selected travel time $t_g$. All such points lie on a curve C which can be found by contouring the function $(t_s + t_r)$ at value $t_g$. FIG. 5 is an illustration of such a constant travel or isotravel time curve. Since the true reflecting point is also a point where the total travel time from S to the reflecting point then to R is $t_g$, it is a point on Curve C.

Curve C has an interesting property. Since it is a contour, points above the curve C will all have a travel time less than $t_g$. In the same respect, all points on the other side of the curve C will have travel times greater than $t_g$.

Let t(x,z) be the total travel time from S to (x,z) to R. Further, let s be a measure of the distance along the reflector such that s increases in one direction and decreases in the opposite direction. For convenience, let s=0 at the reflecting point, even though the exact location of the reflecting point is unknown. It follows that dt/ds=0 at s=0, because Fermat's principle dictates that the actual ray path, namely, the one that reflects at s=0, minimizes the value of t. This means that for all other points s' in a small neighborhood around s=0, we shall have t(s')>t(s=0). Then, all of the points s' are below curve C. However, as indicated in the description of FIG. 5, the point s=0 is on C. Therefore, Curve C touches the true reflector from above at point s=0.

It is to be noted that Fermat's principle states that at the point where the ray refracts, the travel time is also minimized (i.e. dt/ds=0). The foregoing analysis is also true at any refraction point. Therefore, the method of the present invention can also be used in cases where the source and the receiver are on opposite sides of the desired reflector.

Figure 6:
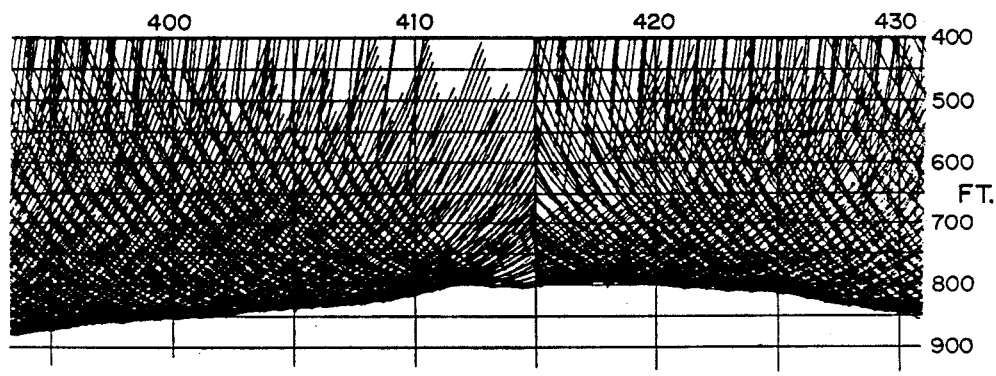
FIG. 6 is an illustration of a sea bottom identified by a series of constant travel time curves.

FIG. 6 is an illustration of the determination of an actual water bottom using the method of the present invention. When a curve for each of the given travel times is obtained, the true reflector is the envelope of all these curves. In principle, if these curves are exact, the true reflecting point can be found by examining the incident and the reflected ray to see which pair obeys Snell's law. In practice, the envelope curve becomes sharply focused at the true interval velocity. The reflector position becomes a by-product of doing velocity analysis. This will be explained in detail as follows.

FIG. 6 shows a well-focused part of an actual water bottom. In the alternative, the water bottom appears to be the summation of lines tangent to the constant velocity curves at the minimum identified by the point where the first derivative (ds/dt) equals zero.

Figure 7:
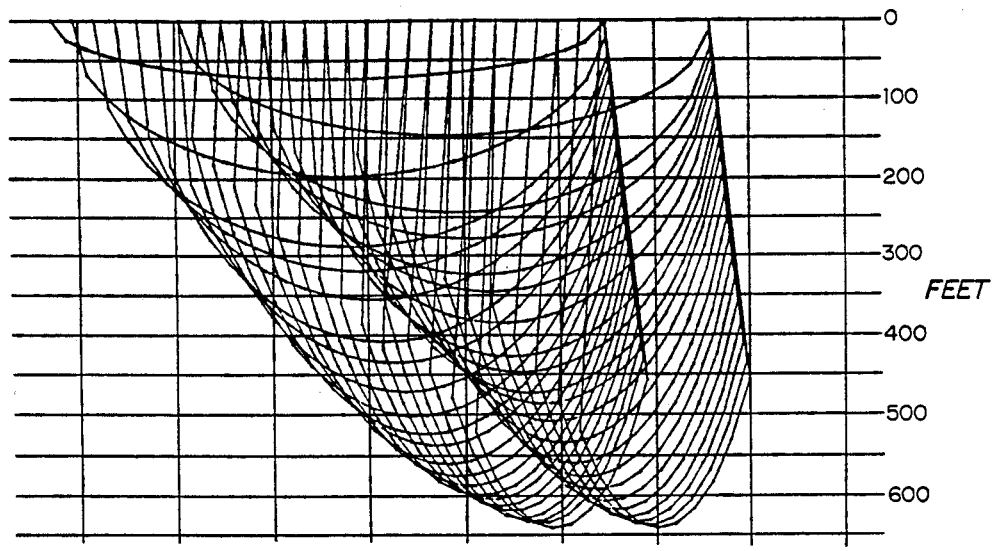
FIG. 7 is an illustration of a series of constant travel time curves having a velocity ten percent too low.
Figure 8:
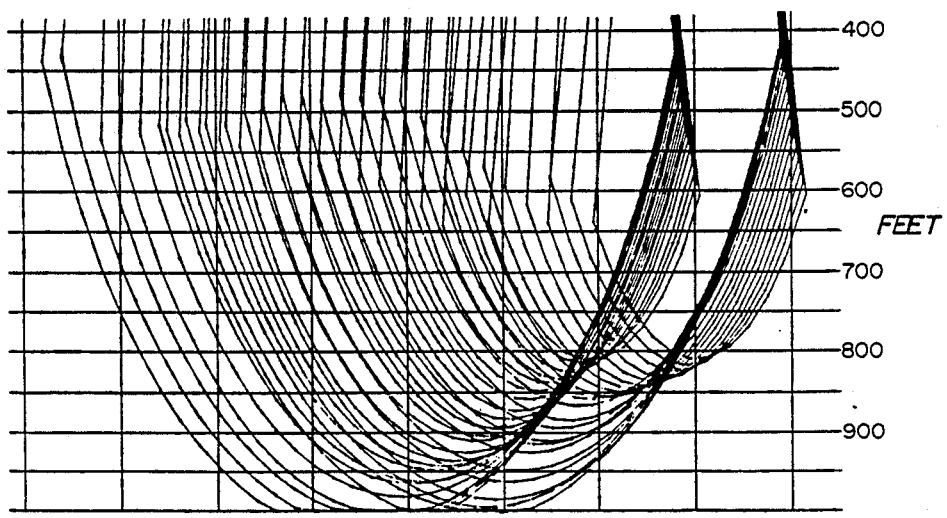
FIG. 8 is an illustration of a series of constant travel time curves having a velocity ten percent too high.

The proposed interval analysis method of the present invention is based on the observation that the focusing of isotravel time curves is very sensitive to the velocity used. FIG. 7 shows the situation when the velocity is ten percent too low. In FIG. 8, the velocity is ten percent too high. Even when the velocity is only one percent too low or too high, a smearing out effect is present.

Figure 9:
FIG. 9 is an illustration of constant travel time curves crossing at a given basement location.

In order to select the velocity where the focus is best, the present invention provides a method to quantify the focusing effect. First, an x is chosen to do the analysis. At the line representing x, all the isotravel time curves that cross x are identified and marked, as illustrated in FIG. 9. The correct velocity is the velocity which gives the highest concentration of crossover points.

Figure 10:
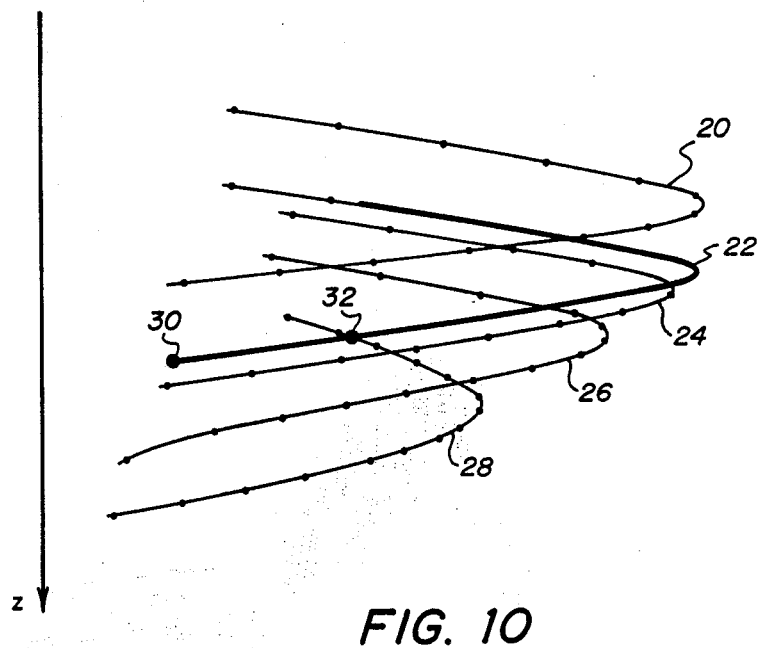
FIG. 10 is an illustration of different wavelets plotted as a function of depth.

In the preferred embodiment of the present invention, each crossover point is replaced by a spike of unit height. The whole distribution is then convolved with a zero phase wavelet. The resultant wavelet is highest when the focus is best. The dropoff is the sharpest at the high-z side, meaning a clean edge at the envelope as illustrated in FIG. 6. In FIG. 10, curves 20, 22, 24, 26 and 28 at a particular x for five different velocities is plotted. At other x positions, similar results are obtained.

Figure 11:
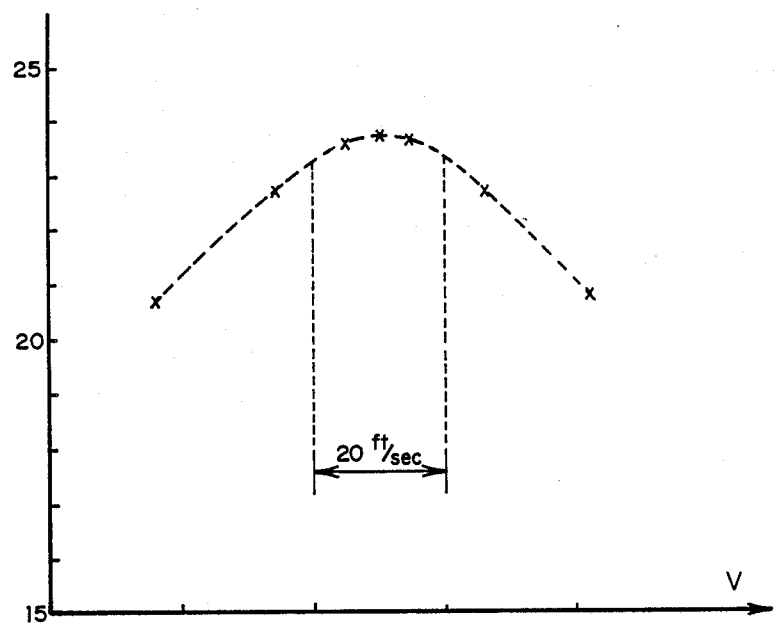
FIG. 11 illustrates wavelet peak height as a function of velocity.

In order to select a velocity that is good for all x's, this computation is repeated at four other x's and the peak heights for each velocity are summed. The result of this procedure is illustrated in FIG. 11. In this figure, the total peak height is summed over five different values. These heights are plotted as a function of velocity. It is quite easy to pick the best velocity from this plot.

The position of the reflector can be obtained at these x's by examining plots as illustrated in FIG. 10. A twenty-five percent height point 30 on the high-z side of the peak for the optimum velocity seems to be a good choice. Also illustrated is a fifty percent height point 32 on the high z side of the peak.

Other applications of the present invention where the source and receiver are on the same side of the reflector may appear in three categories, land based data, vertical seismic profile data and vertical seismic profile data inversion.

First, for the case of land data, only one additional static consideration is necessary. The source and receiver elevation must be known. If reflection from the bottom of the weathering layer can be picked, then we can determine the velocity $V_o$ and the thickness of the weathering layer can be determined.

Figure 12:
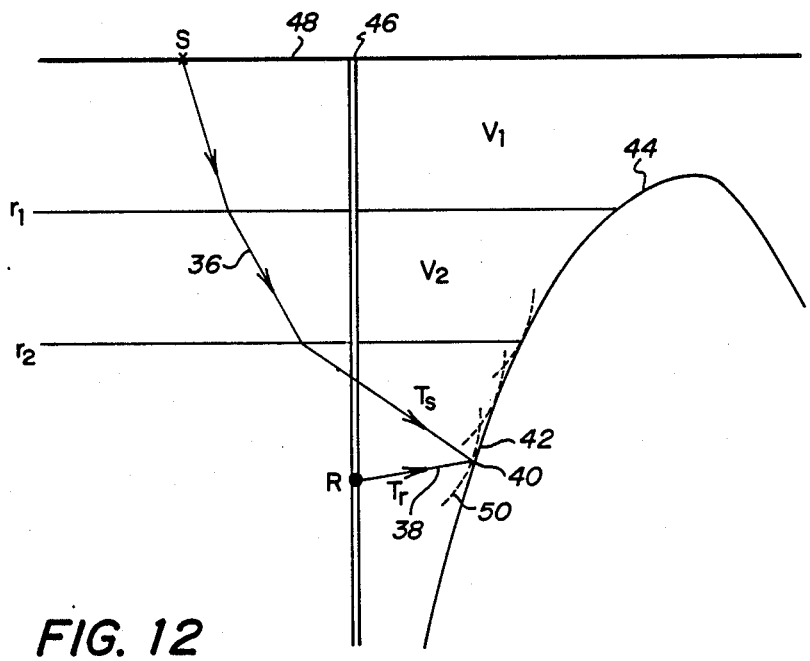
FIG. 12 is an illustration of a raypath reflecting from a salt dome.

In a second application of the present invention, offset vertical seismic profiling is used in the proximity of a salt dome. Source and receiver locations S and R, respectively, are illustrated in FIG. 12 along with raypaths 36 and 38 meeting at reflection point 40 on surface 42 of salt dome 44. Receiver R is located within a borehole 46 at a position below reflector $r_1$ and $r_2$. Source S is location on the surface of the earth 48. Ray 36 travels from S toward reflection point 40 on the salt and another ray 38 travels from R in borehole 46. The velocities of the sediments only are used, namely, the individual sediment layers are assumed to extend infinitely to the right.

Curve 50 is illustrated as being tangential to surface 42 of salt dome 44. The position at which $t_s+t_r=t_g$ is the reflection point 40 and the envelope defines the salt dome. In this application, sedimentary velocities are obtained from other means. Only salt surface 42 is computed.

Figure 13:
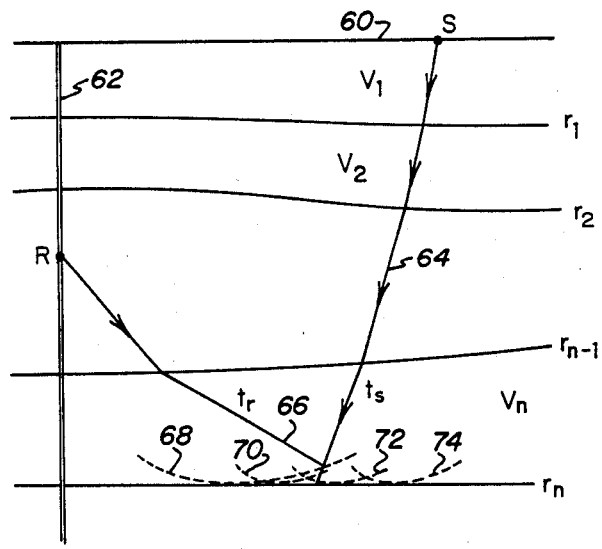
FIG. 13 is an illustration of a raypath in a vertical seismic profile analysis.

A third additional application of the present invention is one of offset vertical seismic profile reflection data inversion. In FIG. 13, source S is located on surface 60 and receiver R is located down borehole 62. Assume the first $(n-1)$ reflectors 20 and the first $(n-1)$ velocities are known and the position of the nth reflector can be determined by providing a ray 64 from the source S down towards reflector $r_n$ and another ray 66 from receiver R downhole toward ray 64 near reflector $r_n$. Curves 68, 70, 72 and 74 where $t_s+t_r=t_g$ may be mapped. All these curves will be tangential to the true reflector at their minimum.

In the event that the source and receiver are on opposite sides of a reflector, such as where a steeply dipping reflector like a salt dome is encountered, the analysis requires additional assumptions. The strong transmission event identified on some shot gathers can be used to delineate one side of salt if the other side of salt, together with the sediment layers, are known.

If it is assumed that the right side of the salt where the rays enter the salt is known, then two models are provided. In the first model, the sediment layers are assumed to extend to the right. A ray is provided from the receiver. In the second model, it is assumed that the salt extends all the way to the left. Another ray is provided from S to the left. Thus, the curve where $t_s+t_r=t_g$ can be located.

On one side of this curve, a ray would be provided starting from R, hence the ray is totally in sediments. On the other side of this curve, a ray would be provided from S and salt velocity is used. On this curve, the equations $dt/ds=0$ and $t_s+t_r=t_g$ are satisfied. Therefore, these curves would be tangential to the salt surface.

If the left side of the salt is given and the right side of the salt is to be located, then in the first model, the salt is extended all the way to right and in the second model, the sediment is extended all the way to left. Computation of the curves would be the same.

Figure 14:
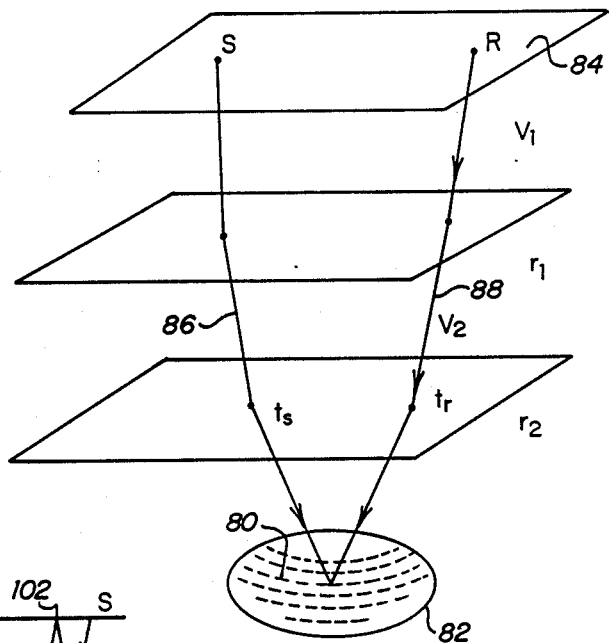
FIG. 14 is an illustration of mapping a reflector in three dimensions.

For three dimensional applications, inversion would be a straight-forward generalization of the two dimensional procedure stated above. FIG. 14 illustrates the three dimensional situation in which a curve 80, where $t_s+t_r=t_g$ is satisfied, is now located on a surface 82 which is tangential to the reflecting surface. Both source S and receiver R are located on surface 84. A ray 86 travels from source S to surface 82 through reflectors $r_1$ and $r_2$ having interval velocities $v_1$ and $v_2$ as illustrated. A ray 88 travels from receiver R to surface 82, also through reflectors $r_1$ and $r_2$. Parallel two dimensional slices may be taken. This reflector may then be mapped on each slice.

In each of the cases, if the wavelet at the selected time is placed where the curve $t_s+t_r=t_g$ is satisfied and is summed over all the selected times, the interfaces have been migrated. This has the advantage that stronger events will be weighted more in the determination of the velocity. If every point of the trace is migrated, we will have the complete result of a Kirchhoff ray tracing migration.

Figure 15:
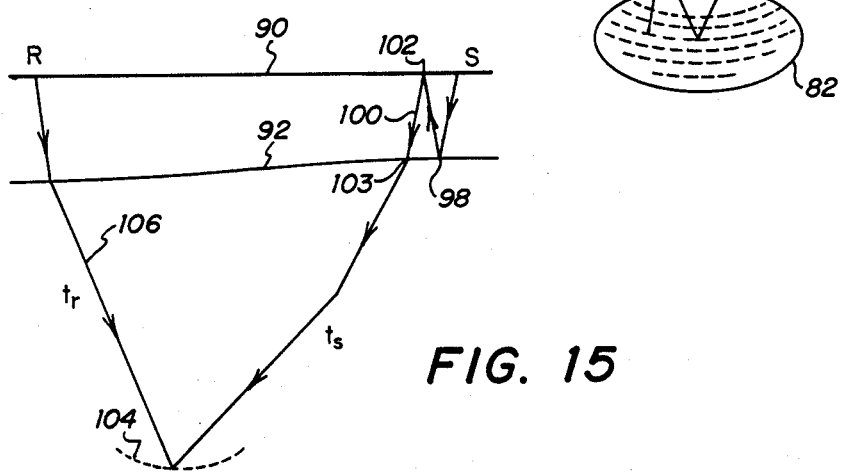
FIG. 15 is an illustration of a raypath having a multiple reflections.

The method of the present invention works equally as well for inhomogeneous velocity layers where we have curved rays. It also works for shear wave converted waves and certain kind of multiples if the ray path is known and the event can be identified on the shot gathers. FIG. 15 illustrates receiver R and source S located on a surface 90. A ray 100 travels from a source S, is reflected at point 98 and point 102 and then transmitted at point 103 and ends at a curve 104. A ray 106 travels from receiver R to curve 104. With the ray path known, the method of the present invention may proceed as previously described.

Although the present invention has been described by way of a preferred embodiment, it is to be understood that this is by way of illustration only and that the present invention is not limited thereto but only by the scope of the following claims.

What I claim is:

1. A method using before-stack seismic data to identify subsurface reflector boundaries and selected interval velocities, comprising the steps of:
   receiving seismic data for a plurality of aligned source/receiver pairs;
   developing isotravel time curves for at least one pair of said plurality of source/receiver pairs;
   selecting a vertical line in alignment with a selected basement position relative to the at least one source/receiver pair;
   determining the crossing points of all the isotravel time curves that cross said vertical line representing said basement position; and
   identifying the correct velocity by locating the section of said vertical line aligned with said basement position on which said crossing points are most concentrated.

2. The method according to claim 1 wherein said identifying step includes the steps of:
   replacing each of said points by a spike of unit height to produce a distribution;
   convolving said distribution with a zero phase wavelet to produce a resultant wavelet; and determining the maximum of said resultant wavelet to identify the correct velocity.

3. The method according to claim 2 also including the steps of:
   summing the peak heights for each velocity;
   selecting the velocity having the maximum peak height.

4. The method according to claim 2 also including the steps of:
   selecting a second vertical line aligned with a second basement position;
   determining the crossing points of all the isotravel time curves that cross said second line representing said second basement position; and
   identifying the correct velocity by locating the section of said second line representing said second basement position on which said crossing points are concentrated.

5. The method according to claim 4 also including the steps of:
   summing the peak heights for each velocity; and
   selecting the velocity having the maximum peak height.

6. A method for determining the depth of a subsurface reflector comprising the steps of:
   receiving seismic data representing travel times of seismic pulses generated by a plurality of seismic sources and received by a plurality of seismic detectors;
   segregating said seismic data into data from selected source receiver pairs;
   determining constant travel time curves for each selected source receiver pair;
   selecting a vertical line in alignment with a basement position relative to each selected source receiver pair;
   determining the crossing points of all constant travel time curves that cross said vertical line representing said basement position;
   identifying the correct velocity by locating the section of said vertical line where said crossing points are most concentrated;
   calculating the minimum for each of said constant travel time curves;
   determining the tangent to each of said constant travel time curves at said minimum; and
   identifying the location of the reflector by connecting said tangents to each of said constant travel time curves.

7. The method according to claim 6 wherein said identifying step includes the steps of:
   replacing each of said points by a spike of unit height to produce a distribution;
   convolving said distribution with a zero phase wavelet to produce a resultant wavelet; and
   determining the maximum of said resultant wavelet to identify the correct velocity.

8. The method according to claim 7 also including the steps of:
   summing the peak heights for each velocity; and
   selecting the velocity having the maximum peak height.

9. The method according to claim 6 also including the steps of:
   selecting a second vertical line aligned with a second basement position relative to a second selected source receiver pair;
   determining the crossing points of all the constant travel time curves that cross said second vertical line representing said second basement position; and
   identifying the correct velocity by locating the section of said second vertical line representing said second basement position on which said crossing points are most concentrated.

10. A method for identifying a constant travel time curve having an accurate subsurface velocity from a plurality of constant travel time curves, each representing a subsurface velocity, comprising the steps of:
    selecting a vertical line representing a plurality of depths for a single basement location;
    mapping the points where each of said plurality of constant travel time curves cross said vertical line;
    identifying a portion of said vertical line having the highest concentration of crossing points;
    determining the mean velocity of the velocities represented by each of said constant travel time curves that intersects said vertical line within said portion; and
    identifying said constant time curve representing said mean velocity as the constant travel time curve having the accurate subsurface velocity.

* * * * *